United States Patent
Petersen et al.

(10) Patent No.: US 9,777,816 B2
(45) Date of Patent: Oct. 3, 2017

(54) TRANSMISSION AND DIFFERENTIAL GEARING AND ENGINE AND GEARING UNIT

(71) Applicant: VOLKSWAGEN AKTIENGESELLSCHAFT, Wolfsburg (DE)

(72) Inventors: Rainer Petersen, Wolfsburg (DE); Jörg Möckel, Sassenburg (DE); Andreas Lutz, Braunschweig (DE); Stefan Hanke, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 218 days.

(21) Appl. No.: 14/652,991

(22) PCT Filed: Dec. 3, 2013

(86) PCT No.: PCT/EP2013/075373
§ 371 (c)(1),
(2) Date: Sep. 30, 2015

(87) PCT Pub. No.: WO2014/095345
PCT Pub. Date: Jun. 26, 2014

(65) Prior Publication Data
US 2016/0025200 A1    Jan. 28, 2016

(30) Foreign Application Priority Data
Dec. 17, 2012    (DE) .................. 10 2012 024 751

(51) Int. Cl.
*B60K 6/365*    (2007.10)
*F16H 37/08*    (2006.01)
(Continued)

(52) U.S. Cl.
CPC .......... *F16H 37/0813* (2013.01); *B60K 1/00* (2013.01); *B60L 3/106* (2013.01); *B60L 15/2054* (2013.01);
(Continued)

(58) Field of Classification Search
CPC .. F16H 2200/2097; F16H 48/11; B60K 6/365
See application file for complete search history.

(56) References Cited

U.S. PATENT DOCUMENTS 5,390,347 A    2/1995 Buri et al.
5,813,488 A    9/1998 Weiss
(Continued)

FOREIGN PATENT DOCUMENTS

CN    101233005 A    7/2008
CN    201672012 U    12/2010
(Continued)

OTHER PUBLICATIONS

International Search Report for PCT International Application No. PCT/EP2013/075373, dated Feb. 21, 2014.
(Continued)

*Primary Examiner* — Tisha Lewis
(74) *Attorney, Agent, or Firm* — Pearl Cohen Zedek Latzer Baratz LLP

(57) ABSTRACT

A transmission and differential gearing with a housing, with an input shaft and two output shafts arranged coaxially with respect to the input shaft, wherein a transmission section and a differential section are provided, wherein the transmission section has two planet stages, namely an input stage and a load stage, wherein the sun wheel of the input stage is actively connected to the input shaft, wherein the load stage has a ring gear fixed to the housing, and the sun wheel of the load stage can be or is actively connected via a web to at least one planet wheel of the input stage, and wherein at least (Continued)

one planet wheel of the load stage is actively connected via a web to an input shaft of the differential section. The requirement for construction space is reduced and the use flexibility increased by the fact that the ring gear of the input stage can be coupled actively and for conjoint rotation to, or can be decoupled from, a planet carrier of the planet wheel of the input stage or to, or from, a planet carrier of the planet wheel of the load stage via a correspondingly provided and/or arranged coupling device.

10 Claims, 6 Drawing Sheets

(51) Int. Cl.
    *B60K 1/00*               (2006.01)
    *B60L 15/20*             (2006.01)
    *B60L 3/10*               (2006.01)
    *F16H 3/66*               (2006.01)

(52) U.S. Cl.
    CPC .......... *F16H 3/66* (2013.01); *B60K 2001/001* (2013.01); *B60L 2240/12* (2013.01); *B60L 2240/30* (2013.01); *B60L 2240/421* (2013.01); *B60L 2240/423* (2013.01); *B60L 2240/486* (2013.01); *B60L 2240/507* (2013.01); *Y02T 10/645* (2013.01); *Y02T 10/72* (2013.01); *Y02T 10/7275* (2013.01)

(56) References Cited

U.S. PATENT DOCUMENTS

| | | | | |
|---|---|---|---|---|
| 8,777,796 | B2* | 7/2014 | Petersen | B60K 1/00 475/269 |
| 9,487,084 | B2* | 11/2016 | Petersen | H02K 7/116 |
| 2004/0220011 | A1* | 11/2004 | Gumpoltsberger | B60K 17/16 475/205 |
| 2007/0021264 | A1* | 1/2007 | Honda | B60K 23/04 475/221 |
| 2012/0031691 | A1 | 2/2012 | Fuechtner et al. | |
| 2013/0267368 | A1 | 10/2013 | Petersen et al. | |
| 2014/0080653 | A1 | 3/2014 | Smetana | |
| 2015/0087459 | A1 | 3/2015 | Petersen et al. | |
| 2015/0111681 | A1* | 4/2015 | Wirth | B60K 1/00 475/150 |
| 2015/0226297 | A1* | 8/2015 | Knoblauch | B60L 15/2054 475/150 |

FOREIGN PATENT DOCUMENTS

| | | | |
|---|---|---|---|
| CN | 104349924 A | 2/2015 | |
| DE | 32 30 121 A1 | 2/1984 | |
| DE | 44 31 929 C1 | 10/1995 | |
| DE | 197 23 776 A1 | 12/1997 | |
| DE | 199 03 936 A1 | 5/2000 | |
| DE | 19962854 | 7/2001 | |
| DE | 100 01 602 A1 | 9/2001 | |
| DE | WO2008110426 A2 * | 9/2008 | ............ F16H 48/20 |
| DE | 10 2007 043 016 A1 | 3/2009 | |
| DE | 10 2010 031 744 A1 | 1/2012 | |
| DE | 10 2010 036 884 A1 | 2/2012 | |
| DE | 10 2010 054 533 A1 | 6/2012 | |
| DE | 10 2011 007 270 A1 | 10/2012 | |
| DE | 10 2011 007259 A1 | 10/2012 | |
| DE | 102013214095 A1 * | 1/2015 | ............ F16H 48/30 |
| EP | 0 536 230 B1 | 4/1993 | |
| EP | 2 511 570 A1 | 10/2012 | |
| WO | WO 92/01173 | 1/1992 | |
| WO | WO 2012/079751 A1 | 6/2012 | |
| WO | WO 2012/139833 A1 | 10/2012 | |
| WO | WO 2013/186168 A1 | 12/2013 | |

OTHER PUBLICATIONS

Search Report for corresponding German Application No. 10 2012 024 751.6, dated Oct. 1, 2013.

Office Action for Chinese Patent Application No. 2013800728099, dated Nov. 1, 2016.

\* cited by examiner

TRANSMISSION AND DIFFERENTIAL GEARING AND ENGINE AND GEARING UNIT

CROSS-REFERENCE TO RELATED APPLICATIONS

This application is a National Phase Application of PCT International Application No. PCT/EP2013/075373, International Filing Date Dec. 3, 2013, claiming priority of German Patent Application No. 10 2012 024 751.6, filed Dec. 17, 2012, each of which is hereby incorporated by reference in its entirety.

FIELD OF THE INVENTION

The invention relates to a transmission and differential gear train having a housing, an input shaft and two output shafts arranged coaxially to the input shaft, whereby a transmission section and a differential section are provided, whereby the transmission section has two planet stages, namely an input stage and a load stage, whereby the sun wheel of the input stage is operatively connected to the input shaft, whereby the load stage has an internal ring gear affixed in the housing and the sun wheel can be or is operatively connected to at least one planet wheel of the input stage via a planet arm, and whereby at least one planet wheel of the load stage is operatively connected to an input shaft of the differential section via a planet arm. The invention also relates to a motor and gear unit having an electric motor onto which the above-mentioned transmission and differential gear train is coaxially flanged.

BACKGROUND OF THE INVENTION

Familiar designs of transmissions in electric vehicles (EV) are based on conventional transmissions for purposes of coupling to internal combustion engines. These transmissions have an axial offset between the input shaft and the output shaft, in other words, between the rotor shaft of the electric motor (e-motor) and the wheel shafts. The flange shafts leading to the wheels run essentially axis-parallel to the drive machines (electric motor or internal combustion engine) and past them. The drive machine is usually uncoupled in the classic manner, namely, by means of a friction clutch situated directly behind the electric motor. This configuration of the uncoupling mechanism is described, for example, in German patent application DE 10 2007 043 016 A1.

For many electric vehicle applications or hybrid drives, it is sufficient to connect the electric motor to the wheels by means of only one fixed gear transmission or to operatively connect it to the wheels. The electric motor provides a high torque starting right from when the (motor) vehicle is at a standstill, thus dispensing with the start-up element that is necessary in conventional powertrains (with internal combustion engines). The transmission converts the torque of the electric motor, so that the vehicle can start up at its limit of grip. In some vehicle applications, however, the gear transmission ratio defined by this is not sufficient to actually reach the desired final vehicle speed at the maximum rotational speed of the electric motor. In these cases, an additional gear transmission ratio has to ensure that, by means of the electric drive, in other words, by means of the electric motor, not only the required "start-up performance" but also the ultimately desired final speed of the motor vehicle can be achieved. Up until now, however, transmission manufacturers have only produced "two-speed drives" for purely electric vehicles in the axis-parallel design described above.

Thus, gear trains that are structured coaxially to the electric motor are also known that have a transmission section with two planet stages (planetary gears). Here, the transmission section has separate planetary gears coaxially arranged in series, whereby the gear train thus created only requires a small radial and axial installation space and it can provide the requisite total transmission ratio without any problems. Currently, several embodiments of this gear train are being developed and refined; thus, for instance, a coupling mechanism is known which uncouples the electric motor from the powertrain of such a transmission, whereby the uncoupling mechanism is actuated electromechanically and can be integrated into the transmission so as to be essentially "installation-space neutral".

However, other hybrid drive systems for motor vehicles are also known from the state of the art. For instance, German patent specification DE 44 31 929 C1 discloses a transmission that improves the start-up capacity of a motor vehicle in that there is a separate reduction gear, for example, a planetary gear, located on the intermediate shaft between the drive pinion and another toothed wheel.

European patent specification EP 0 536 230 B1 also discloses a transmission for a motor vehicle which is partially configured as a planetary gear, whereby coupling mechanisms, especially sliding muff-type coupling mechanisms, can serve to couple the internal ring gear of the planetary gear to various components.

German patent application DE 32 30 121 A1 also discloses a hybrid drive system for vehicles with which, in order to achieve a particularly efficient and effective function of such a drive system, the crankshaft (which is configured without a flywheel) of the reciprocating piston internal combustion engine is or can be connected via a first coupling mechanism directly to the rotor of the electric motor that functions as a flyweight for the drive motor and that is or can be connected to the input shaft of the gear train via another coupling mechanism. The construction resources required here, however, are substantial.

Finally, German patent application DE 199 03 936 A1 discloses a transmission for motor vehicles comprising two planetary gears that are each coupled to a transmission shaft on which there are input toothed wheels for various gear transmission ratios. The planetary gears arranged here are situated in the same plane, whereby each planetary gear is to be coupled to a separate electric machine. Here, too, the construction resources required are substantial, especially when two electric motors are to be provided.

Finally, German patent application DE 100 01 602 A1 discloses a transmission in which a planet set or a planetary gear system is employed in order to double the number of speeds that are to be provided, and German patent application DE 197 23 776 A1 discloses an electric single-wheel drive for a vehicle which is intended to achieve a large speed range for the vehicle, whereby a transmission that can shift between at least two rotational speed transmission stages is arranged between the electric motor and the final drive transmission.

A problematic aspect of the hybrid drives known from the state of the art or of the transmissions employed for them is that the construction resources required and the requisite installation space are substantial. This is especially the case when, in order to cover a large speed range for the motor vehicle, the transmission is supposed to be configured so as to be "two-speed", in other words, to have at least two gears or two gear stages with the appropriate transmission. The shifting mechanisms provided for this purpose and their arrangement or their components require a great deal of installation space in the prior-art transmission systems.

SUMMARY OF THE INVENTION

Before this backdrop, the invention is based on the objective of configuring and refining the above-mentioned transmission and differential gear train in such a way that, on the one hand, the gear train allows the implementation of two-gear stages and, on the other hand, it essentially avoids increasing the installation space needed for the gear train, whereby, at the same time, the flexibility of use and the efficiency of the gear train are improved.

The above-mentioned objective is thus achieved in that, by means of a coupling mechanism that is appropriately provided and/or arranged, the internal ring gear of the input stage can be operatively and non-rotatably coupled to or uncoupled from a planet carrier of the planet wheel of the input stage or else coupled to or uncoupled from a planet carrier of the planet wheel of the load stage.

Owing to the positive-fit configuration of the coupling mechanism, along with its appertaining components, the coupling mechanism can be integrated into the gear train in a particularly "installation-space neutral" manner. For this purpose, already existing flange positions and/or already existing housing surfaces as well as already existing gear teeth of the input shaft and/or of other shafts can be used as well. Shifting from the first gear stage to the second gear stage of the gear train can be done essentially load-free since the relative rotational speeds can be synchronized by the drive motor. Uncoupling is done in the "neutral" shifting position of the coupling mechanism. In addition, in order for the vehicle to be towed, it is also possible to have or to select "manual" uncoupling (mechanically or electrically). As will be explained more comprehensively in the elaborations below, the transmission and differential gear train according to the invention has two planet stages (planetary gears) arranged in series, namely, an input stage and a load stage. These two planet stages are permanently coupled to each other by means of appropriate connections (planet arms), thus effectuating the envisaged transmission ratio. Additional transmission ratios, namely, a first and second gear stage, can be generated when these connections are released or changed, namely, by means of the above-mentioned coupling mechanism. In this manner, several—here, preferably two—gear stages can be implemented, without the need to integrate additional toothed wheel stages. The large gear ratio between the two gear stages that is generally required for electric drives can be achieved especially when a planet stage is completely short-circuited (rotates as a block). This should preferably be the case particularly in the higher gear, in other words, when the second gear stage is implemented, since longer holding times normally occur here. In the preferred embodiment being achieved here, the first gear stage is now implemented in that the coupling mechanism operatively and non-rotatably couples the internal ring gear of the input stage to a planet carrier of the planet wheel of the load stage, whereby the second gear stage is implemented in that the coupling mechanism operatively and non-rotatably couples the internal ring gear of the input stage to a planet carrier of the planet wheel or to the planet set of the input stage. This will be elaborated upon in detail below. In particular, the above-mentioned drawbacks are avoided and commensurate advantages are achieved, whereby an uncoupling of the electric motor can additionally be used in order to effectuate an energy-saving "coasting operation" of a single-axle-driven vehicle, or else in order to increase the efficiency of a two-axle-driven vehicle (by uncoupling one axle during partial-load operation). The differential section can advantageously be configured as a spur gear differential, particularly as a double planet wheel set in which the planet arm serves as the input shaft and each sun wheel is connected to an output shaft. In a particularly advantageous variant, the bolts that support the planets of the load stage can be together with the bolts that support the first group of the planets of the spur gear differential. As a result, the application possibilities of the gear train according to the invention are increased while, at the same time, the installation space is correspondingly reduced.

There are numerous possibilities to advantageously configure and refine the transmission and differential gear train according to the invention. The preferred embodiment of the invention will be explained in greater detail below on the basis of the description below and on the basis of the accompanying drawings.

DETAILED DESCRIPTION OF THE INVENTION

Figure 1:
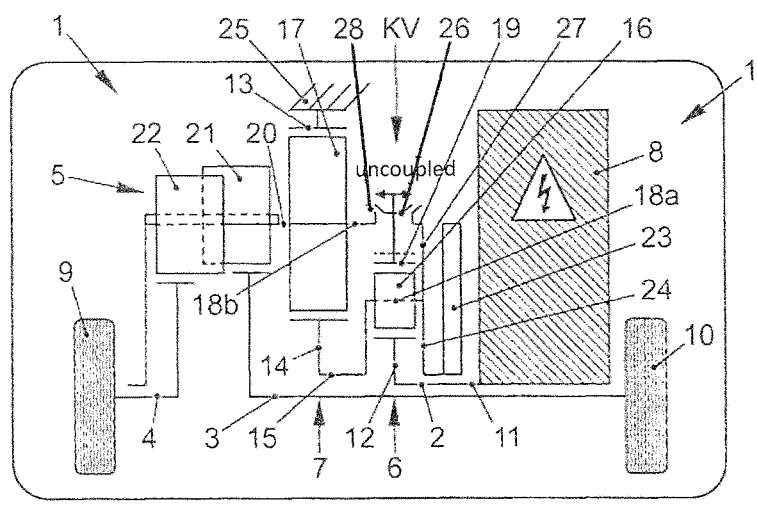
FIG. 1: a schematic view of a drive unit of a motor vehicle having the motor and gear unit according to the invention, depicting the positioning of the coupling mechanism in its neutral position.
Figure 2:
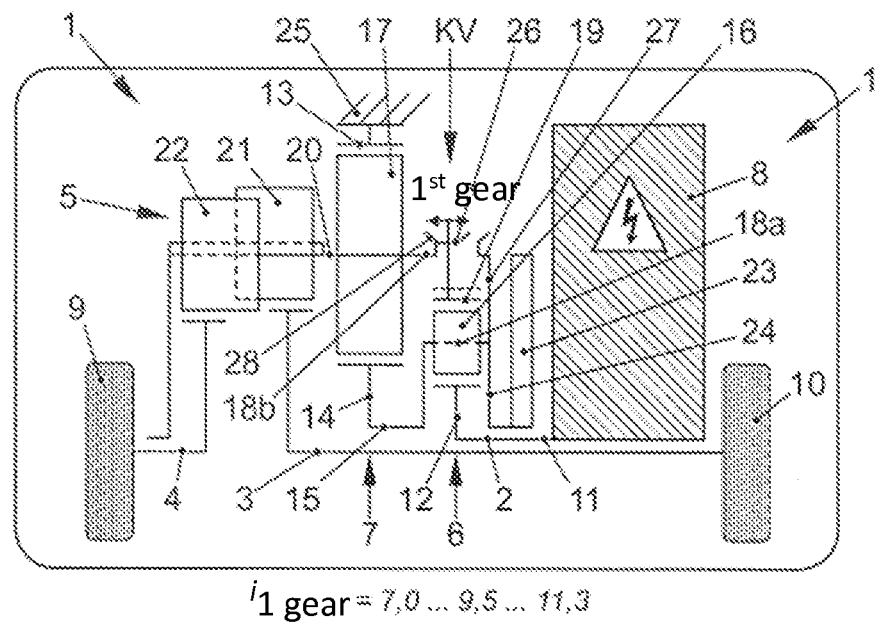
FIG. 2: a schematic view of a drive unit of a motor vehicle having the motor and gear unit according to the invention, depicting the positioning of the coupling mechanism in order to implement the first gear stage, namely, with the coupling of the appertaining internal ring gear to the planet carrier of the load stage.
Figure 3:
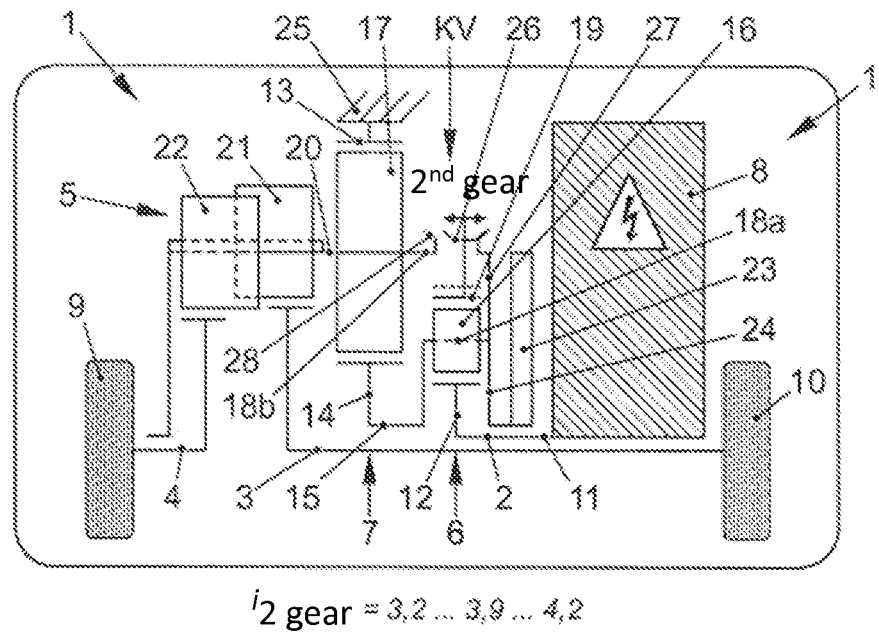
FIG. 3: a schematic view of a drive unit of a motor vehicle having the motor and gear unit according to the invention, depicting the positioning of the coupling mechanism in order to implement the second gear stage, namely, with the coupling of the appertaining internal ring gear to the planet carrier of the input stage.

FIGS. 1 to 3 show a schematic view of a transmission and differential gear train 1 for a vehicle, especially for a motor vehicle (not shown in greater detail here), whereby the housing 25 of the transmission and differential gear train 1 is also shown only schematically.

The transmission and differential gear train 1 has an input shaft 2 and two output shafts 3 and 4 arranged coaxially to the input shaft 2. The transmission and differential gear train 1 has a transmission section and a differential section configured as a spur gear differential 5. The transmission section (not shown in greater detail here) has two planet stages (especially two planetary gears axially arranged in series), namely, an input stage 6 and a load stage 7.

In the normal "half-view" shown in FIGS. 1 to 3, the appertaining elements of the transmission and differential gear train 1 can be clearly seen. For this reason, FIGS. 1 to 3 only show the "upper half" of the actually rotation-symmetrical device, namely, the essential rotating components of the transmission and differential gear train 1, in schematic form. The drive unit depicted here, namely, the transmission and differential gear train 1 shown here, serves to transfer a torque generated by a drive motor, especially an electric motor 8, onto the driving wheels, i.e. the wheels 9 and 10 of a driven axle of a motor vehicle.

FIGS. 1 to 3 schematically show the essential components of the transmission and differential gear train 1, whereby the positioning of the coupling mechanism KV, which will be elaborated upon more extensively below, is schematically shown in FIG. 1 or 2 and in FIG. 3. The positioning and also the configuration of the coupling mechanism KV shown here will be elaborated upon once again in greater detail below, especially on the basis of FIGS. 4 to 6. Before that, additional components of the transmission and differential gear train 1 shown here will be elaborated upon as well as explained in greater detail below.

The transmission and differential gear train 1, which serves to transfer the torque from the drive motor—here, the electric motor 8—to the wheels 9 and 10, consists essentially of three functional groups. These are the input stage 6, the load stage 7 and a differential stage or a differential section, which can also be referred to or configured here as a spur gear differential 5. The individual stages 6, 7 and 5 are adjacent to each other in the order mentioned here and are arranged compactly next to each other or axially adjacent to each other.

The drive motor—here the electric motor 8—has an output shaft 11 which is arranged concentrically to the motor windings (not shown in greater detail here) and which is especially configured as a hollow shaft. Adjoining this output shaft 11, there is the input shaft 2—likewise configured as a hollow shaft—of the transmission and differential gear train 1, but both components can also be configured as an integral part. The transmission section, as already mentioned, has two planet stages, namely the input stage 6 and the load stage 7. The sun wheel 12 of the input stage 6 is operatively connected to the input shaft 6, whereby the load stage 7 has an internal ring gear 13 which is affixed in the housing, and the sun wheel 14 of the load stage 7 is or can be operatively connected via a planet arm 15 to at least one planet carrier 18*a* of the planet wheel 16, especially to the planet set of the input stage 6. In this context, depending on the embodiment, the planet arm 15 and the planet carrier 18*a* can be configured as separate parts or as integrated parts or else as an integral part. Finally, at least one planet wheel 17 of the load stage 7 or of the planet set is operatively connected via a planet arm 20 or via the planet carrier 18*b* to an input shaft of the spur gear differential 5.

It can be seen from the elaborations above that the input stage 6 has a sun wheel 12, a planet set, especially at least one planet wheel 16, preferably several planet wheels 16, as well as—now being mentioned—an internal ring gear 19, whereby the load stage 7 has a sun wheel 14, a planet set, especially at least one planet wheel 17, preferably several planet wheels 17, and an internal ring gear 13, as can be seen in FIGS. 1 to 3.

Together, the input stage 6 and the load stage 7 form the transmission section of the transmission and differential gear train 1, yielding a corresponding total transmission system.

The planet arm 20 of the load stage 7 serves as the output element of the transmission section. By means of this planet arm 20, the transmission section is operatively connected to the spur gear differential 5, here especially to a double set of planet wheels 21 and 22, which intermesh. By means of the familiar arrangement of the spur gear differential 5, the planet wheels 21 and 22 transfer the appropriate rotation to the respective output shafts 3 and 4 of the transmission and differential gear train 1. In this context, the planet carriers 18*b* and the planet arm 20 can be configured as an integral part.

As can be seen in FIGS. 1 to 3, a parking lock wheel 23 is additionally provided in order to implement a parking lock, whereby the parking lock wheel 23 is connected via an appropriate planet arm 24 (or a parking lock shaft) to the planet wheel 16 or to the corresponding planet set of the input stage 6 and it engages with a parking lock mechanism provided in the housing 25.

It fundamentally applies that, in order to transfer the appropriate torque via a planet stage, the appertaining components have to be operatively connected, that is to say, the free rotation of, for instance, a sun wheel or of an internal ring gear would cause an uncoupling of the appertaining planet stage, so that a torque could no longer be transferred.

The above-mentioned drawbacks are now prevented in that, by means of an appropriately provided and/or arranged coupling mechanism VK, the internal ring gear 19 of the input stage 6 can be operatively and non-rotatably coupled to as well as uncoupled from a planet carrier 18*a* of the planet wheel 16, and correspondingly coupled to as well as uncoupled from the planet set of the input stage 6, or else coupled to as well as uncoupled from a planet carrier 18*b* of the planet wheel 17 of the load stage 7. The first and second gear stages are then implemented by means of the above-mentioned alternatives.

FIG. 1 shows the coupling mechanism KV in its neutral position, while FIG. 2 shows the coupling mechanism KV in a position in which the internal ring gear 19 of the input stage 6 is coupled to the planet carrier 18*b* of the load stage 7, while FIG. 3 shows the coupling mechanism KV in the position in which the internal ring gear 19 of the input stage 6 is operatively coupled to the planet carrier 18*a* of the planet wheel 16 or to the planet set of the input stage 6. In the latter case, the input stage 6 rotates "as a block", thus implementing the additional, second gear stage of the transmission and differential gear train 1. This means that, if the internal ring gear 19 of the input stage 6 is operatively, especially non-rotatably, coupled to the planet carrier 18*b* of the load stage 7, the first gear stage is implemented in the transmission and differential gear train 1 which preferably effectuates a transmission ratio between 7.0 and 11.3, especially 9.5, whereby the second gear stage in the gear train is implemented when the internal ring gear 19 of the input stage 6 is non-rotatably connected to the planet carrier 18*a* of the planet wheel 16 or to the planet set of the input stage 6, and consequently, the entire stage rotates "as a block"; in the latter case, the total transmission ratio in the gear train is preferably between 3.2 and 4.2, especially 3.9.

Figure 4:
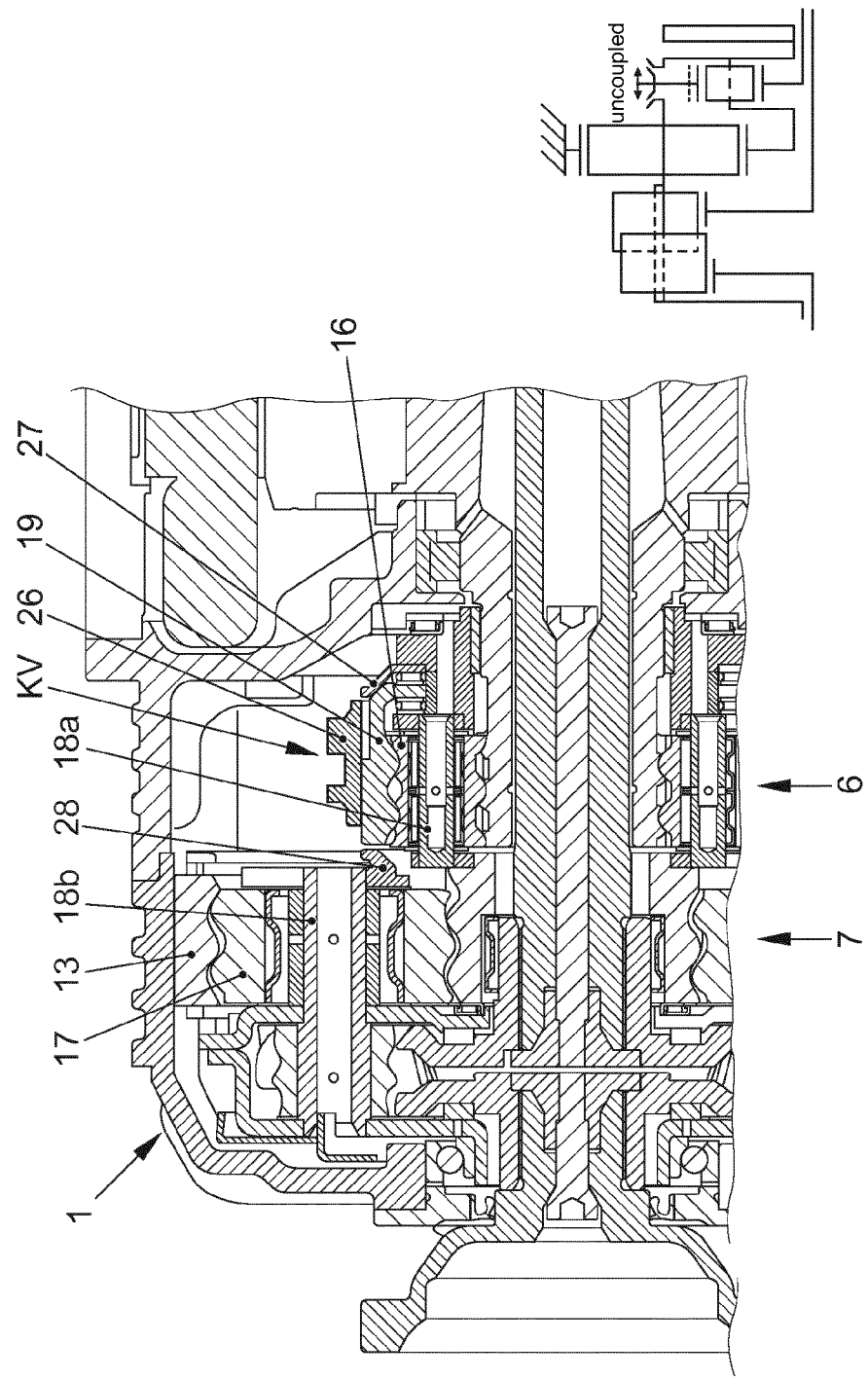
FIG. 4: a schematic, partially cutaway view of the essential components of the gear train with the coupling mechanism in the neutral position.
Figure 5:
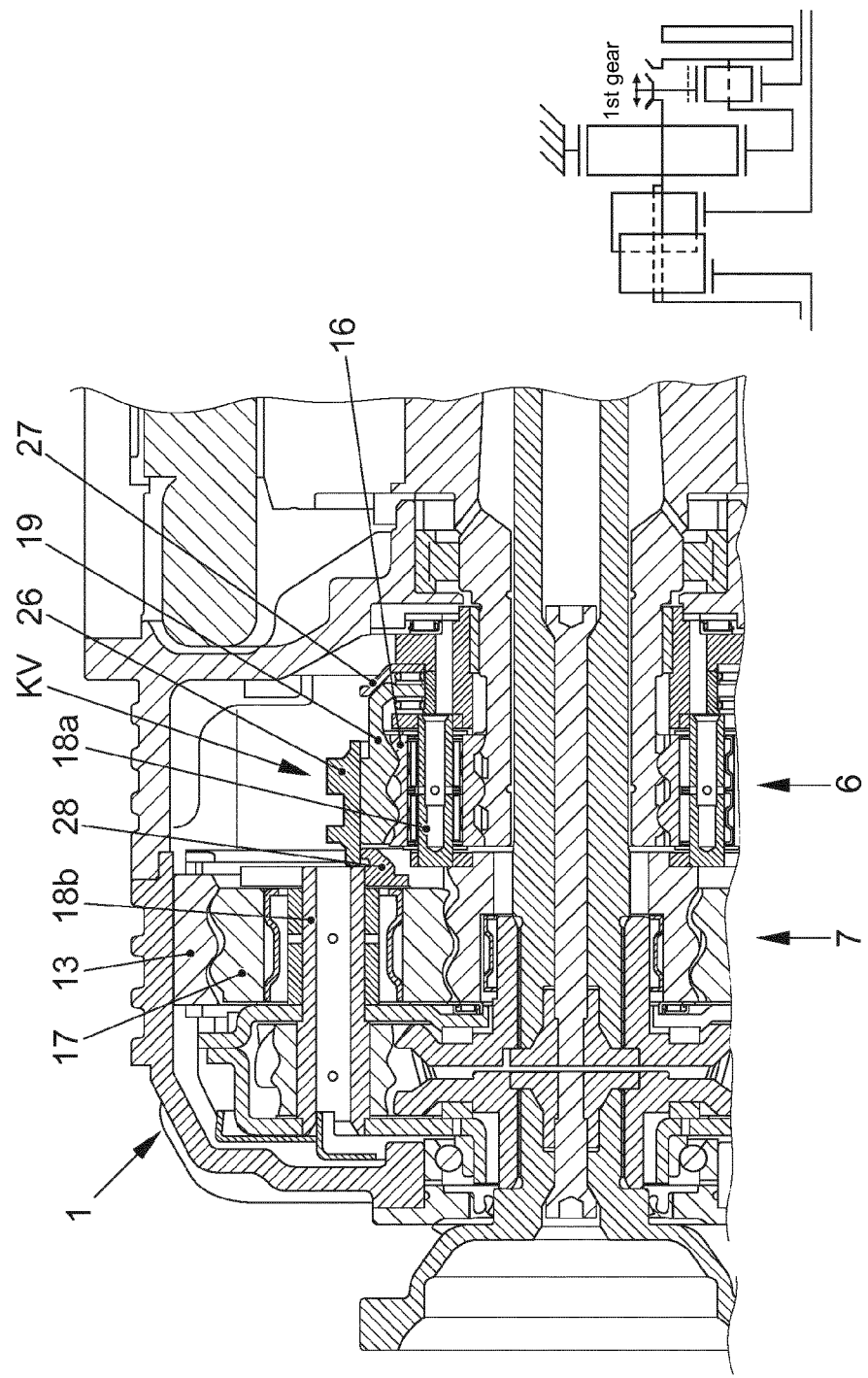
FIG. 5: a schematic, partially cutaway view of the components from FIG. 4, with the coupling mechanism, whereby the internal ring gear of the input stage is operatively coupled to the planet carrier of the load stage.
Figure 6:
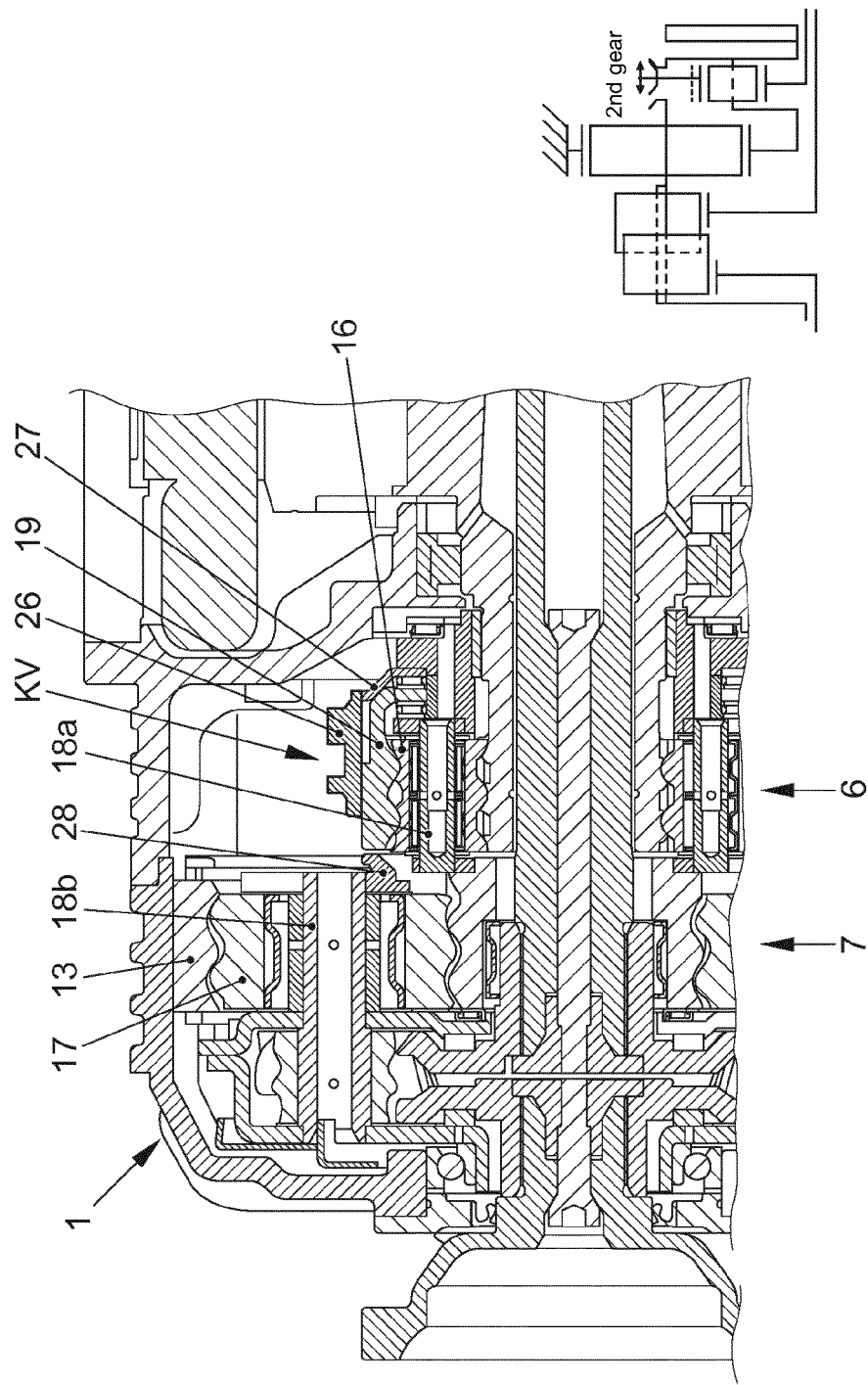
FIG. 6: essentially the components shown in FIGS. 4 and 5, in a schematic view with the coupling mechanism, whereby the internal ring gear of the input stage is coupled to the planet carrier of the planet wheel of the input stage.

Even though FIGS. 1 to 3 show that the coupling mechanism KV can be integrated into the transmission and differential gear train 1 installation-space neutrally, the manner in which this has been implemented in the concrete technical configuration or arrangement of the appertaining components is shown in FIGS. 4 to 6, which will be elaborated upon in greater detail below.

First of all, the coupling mechanism KV is configured and/or realized in such a way that the coupling or uncoupling of the appertaining elements is implemented by the positive-fit elements that have been provided, as a result of which especially a positive-fit coupling is achieved. The coupling mechanism KV has a coupling ring 26, a coupling wheel 27 and a clutch drive ring 28 (which can also be referred to as a second coupling wheel).

FIGS. 4 to 6 clearly show the coupling mechanism KV with the appertaining components, namely, the coupling ring 26, the coupling wheel 27 and the clutch drive ring 28. As is shown in FIGS. 4 to 6, however, even in the case of a different positioning of the coupling mechanism KV, namely, of the coupling ring 6 (which can also be referred to as the synchronous ring), when it is moved to the right or to the left, there is no need to enlarge the installation space of the gear train, in other words, of the transmission and differential gear train 1, which especially translates into the above-mentioned advantages. Since the coupling mechanism KV and its components are configured in such a way that the coupling or uncoupling of the appertaining elements/components is implemented by means of positive-fit elements that have been provided and that do not take up an unnecessarily large installation space, it is possible to attain the above-mentioned advantages.

Making reference to FIGS. 4 to 6, the following can now be elaborated upon:

The coupling mechanism KV is now configured in such a way that, to start with, it has the coupling ring 26, which can be moved in the axial direction and which is non-rotatably connected to the internal ring gear 19 of the input stage 6. For this purpose, the inner circumference of the coupling ring 26 has an internal spline while the outer circumference of the internal ring gear 19 has an external spline, whereby these two engage with each other.

FIG. 4 shows the coupling mechanism KV in its neutral position; here, the coupling ring 26 is not connected non-rotatably to the coupling wheel 27 or to the clutch drive ring 28. However, since the coupling ring 26 is arranged so that it can move axially on the internal ring gear 19, and the coupling ring 26 as well as the internal ring gear 19 have splines that engage with each other, the internal ring gear 19 can now be non-rotatably connected by means of the coupling ring 26, namely, either to the coupling wheel 27 or to the clutch drive ring 28.

Here, the clutch drive ring 28 is operatively or non-rotatably connected to the planet carrier 18b.

The coupling wheel 27 is operatively connected to the planet carrier 18a of the planet wheel 16 of the input stage 6, as can be seen in FIGS. 4 to 6.

In order to now operatively connect the coupling wheel 27 to the planet carrier 18a or to the planet carriers 18a of the planet wheels 16 of the input stage 6, teeth that match the spline of the coupling ring 26 are provided on the outer circumference of the coupling wheel 27. Therefore, when the coupling ring 26 is moved to the right, as shown in FIG. 6, then the spline on the inner circumference of the coupling ring 26 engages with teeth provided on the outer circumference of the coupling wheel 27, so that both components are non-rotatably connected to each other and, in the final analysis, the internal ring gear 19 of the input stage 6 is then non-rotatably connected to the planet carrier(s) 18a of the planet wheels 16 of the input stage 6, so that, in this case, the entire planet stage rotates "as a block" and thus also the second gear stage of the gear train, namely of the transmission and differential gear train 1, has been implemented or engaged. For this reason, FIG. 6 corresponds to the schematic view shown in FIG. 3. Therefore, in order to operatively couple or implement the second gear stage, the coupling ring 26 can be moved by the coupling wheel 27, as shown in FIG. 6 (namely, moved to the right here).

As shown in FIG. 5, the coupling ring 26 can also be moved to the left, in which case the coupling ring 26 engages with the clutch drive ring 28. As already mentioned, the clutch drive ring 28 is preferably arranged and/or attached non-rotatably to the planet carrier 18b of the load stage 7 and it has external teeth (not shown here). The coupling ring 26 has internal teeth that can be made to engage with the teeth of the clutch drive ring 28 and it can be moved at least partially onto the clutch drive ring 28 in order to achieve the operative coupling. The operative coupling of the coupling ring 26 and of the clutch drive ring 28 is shown here in FIG. 5, whereby FIG. 5 corresponds essentially to the schematic view shown in FIG. 2. Consequently, FIGS. 2 and 5 show the implementation of the first gear stage in the gear train, here in the transmission and differential gear train 1.

Therefore, FIGS. 1 to 6 show the transmission and differential gear train 1 or the motor and gear unit having an electric motor 8 and a transmission and differential gear train 1 flanged coaxially onto the electric motor 8. In this context, the output shaft 11 of the electric motor 8 is connected to the input shaft 2 of the gear train 1 and it is configured as a hollow shaft, whereby one of the output shafts 3 of the gear train passes coaxially through the hollow shaft.

Figure 7:
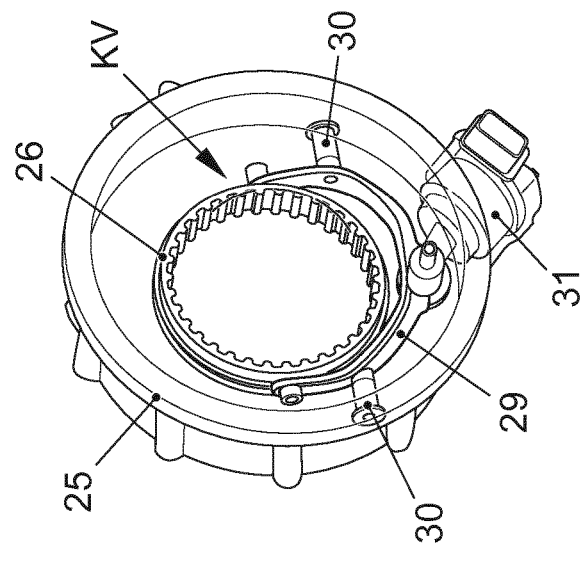
FIG. 7: the essential components of the coupling mechanism, namely, the sliding muff-type coupling mechanism and the coupling ring as well as the gearshift fork and additional components, in a schematic, slightly perspective view.
Figure 7:
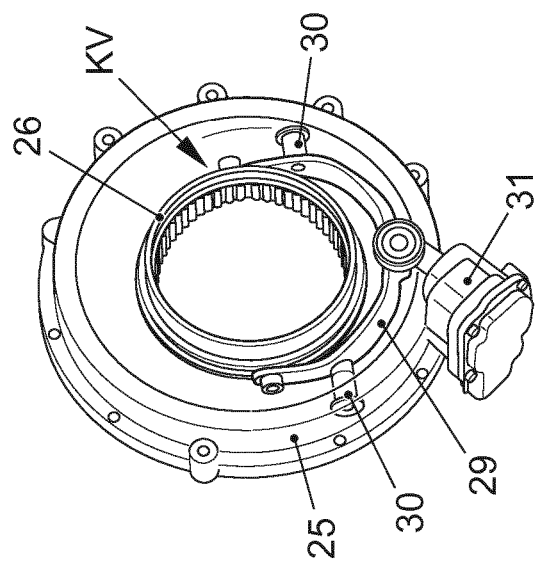

FIG. 7 finally shows in schematic form the implementation or actuation of the coupling ring 26, which can also be referred to as a "synchronous ring". FIG. 7 clearly shows the coupling ring 26 which passes appropriately through a gearshift fork 29 which, in turn, is pivotably mounted on two bearing points 30 in the housing 25, whereby the gearshift fork itself can be actuated by a servomotor 31. Through the actuation of the servomotor 31, the gearshift fork 29 can be easily pivoted, as a result of which the coupling ring 26 can be correspondingly moved axially.

By means of the transmission and differential gear train 1 according to the invention shown here, decisive advantages can be attained, some of which have already been mentioned above but to which reference is hereby being made once again, although the following should still be elaborated upon once more:

The coupling mechanism KV shown can be integrated into the transmission and differential gear train 1 installation-space neutrally. Towards this end, use can be made of identical flange positions and/or identical connectors as well as of bearing surfaces, and already existing teeth on the appertaining shafts can also be employed. Shifting the gear stages from first to second can especially be done load-free, whereby the relative rotational speeds of the electric motor 8 are synchronized. In the neutral position of the coupling mechanism KV, the corresponding uncoupling of the transmission from the electric motor 8 is implemented, and this is also possible at high torques. The actuation of the coupling mechanism KV, especially of the coupling ring 26, is achieved correspondingly by means of a separate servomotor 31 (mechanically, electrically or else hydraulically), whereby the possibility of manual uncoupling also exists so that the motor vehicle can be towed.

The fact that two gear stages are now implemented in the transmission and differential gear train 1 translates into greater flexibility for the entire transmission system and into better application possibilities; in particular, the implementation of the second-gear stage, namely, the coupling of the internal ring gear 19 of the input stage 6 to the planet carrier 18a of this planet stage, leads to the implementation of the second gear stage, whereby, in this case, the input stage 6 then rotates "as a block" and essentially only the load stage 7 is still responsible for the entire transmission system.

LIST OF REFERENCE NUMERALS 1 transmission and differential gear train
2 input shaft
3 output shaft
4 output shaft
5 spur gear differential
6 input stage
7 load stage
8 electric motor
9 wheel
10 wheel
11 output shaft of the electric motor
12 sun wheel of the input stage
13 internal ring gear of the load stage
14 sun wheel of the load stage
15 planet arm of the input stage
16 planet wheel of the input stage
17 planet wheel of the load stage
18a planet carrier of the input stage
18b planet carrier of the load stage
19 internal ring gear of the input stage
20 planet arm of the load stage
21 planet wheels
22 planet wheels
23 parking lock wheel
24 planet arm, parking lock shaft
25 housing
26 coupling ring
27 coupling wheel
28 clutch drive ring
29 gearshift fork
30 bearing points
31 servomotor
VK coupling mechanism

The invention claimed is:

1. A transmission and differential gear train comprising:
a housing,
an input shaft,
two output shafts arranged coaxially to the input shaft, and
a transmission section and a differential section configured as a spur gear differential,
wherein the transmission section has two planet stages, namely an input stage and a load stage,
wherein a first sun wheel of the input stage is operatively connected to the input shaft,
wherein the load stage comprises a first internal ring gear affixed in the housing, and a second sun wheel of the load stage is configured to be operatively connected to at least one first planet wheel of the input stage via a first planet arm,
wherein at least one second planet wheel of the load stage is operatively connected to an input shaft of the spur gear differential via a second planet arm, and
wherein, via a coupling mechanism, a second internal ring gear of the input stage is configured to be operatively and non-rotatably coupled to, or uncoupled from, a first planet carrier of the at least one first planet wheel of the input stage, or coupled to or uncoupled from a second planet carrier of the at least one second planet wheel of the load stage.

2. The transmission and differential gear train according to claim 1, wherein the coupling mechanism is configured such that the coupling or uncoupling of the appertaining elements is implemented by positive-fit elements configured to achieve a positive-fit coupling.

3. The transmission and differential gear train according to claim 1, wherein a third planet arm or a parking lock shaft of the at least one first planet wheel of the input stage is connected to a parking lock spur wheel that engages with a parking lock mechanism provided in the housing.

4. The transmission and differential gear train according to claim 1, wherein the coupling mechanism comprises a coupling ring, a coupling wheel and a clutch drive ring.

5. The transmission and differential gear train according to claim 4, wherein the coupling ring is configured to move axially on the second internal ring gear, and the coupling ring, as well as the second internal ring gear, comprise splines configured to engage with each other.

6. The transmission and differential gear train according to claim 5, wherein the coupling wheel is operatively connected to the first planet carrier of the at least one first planet wheels of the input stage, and wherein the coupling wheel comprises teeth on an outer circumference thereof that match the spline of the coupling ring.

7. The transmission and differential gear train according to claim 6, wherein the coupling wheel is configured to move the coupling ring in order to achieve an operative coupling.

8. The transmission and differential gear train according to claim 4, wherein the clutch drive ring is operatively and non-rotatably connected to the second planet carrier of the at least one second planet wheel of the load stage, or is connected to the second planet arm of the load stage, and/or the clutch drive ring is arranged on and/or attached to the second planet carrier, and wherein the clutch drive ring has external teeth on a projection area.

9. The transmission and differential gear train according to claim 4, wherein the coupling ring is configured to be moved, at least partially, onto the clutch drive ring in order to achieve an operative coupling.

10. A motor and gear unit comprising:
an electric motor; and
the transmission and differential gear train according to claim 1
wherein the transmission and differential gear train is coaxially flanged onto the electric motor,
wherein a motor output shaft of the electric motor is connected to the input shaft of the gear train; and
wherein the motor output shaft is configured as a hollow shaft, whereby one of the output shafts of the gear train passes coaxially through the hollow shaft.

* * * * *